(12) United States Patent
Witko (10) Patent No.: US 8,197,724 B2
(45) Date of Patent: Jun. 12, 2012

(54) DELENSING OF OPHTHALMIC LENSES USING GAS

(75) Inventor: Zbigniew Witko, Pleasanton, CA (US)

(73) Assignee: Coopervision International Holding Company, LP, St. Michael (BB)

( * ) Notice: Subject to any disclaimer, the term of this patent is extended or adjusted under 35 U.S.C. 154(b) by 0 days.

(21) Appl. No.: 12/829,110

(22) Filed: Jul. 1, 2010

(65) Prior Publication Data

US 2010/0264556 A1 Oct. 21, 2010

Related U.S. Application Data

(63) Continuation of application No. 11/752,877, filed on May 23, 2007, now Pat. No. 7,811,483.

(60) Provisional application No. 60/803,689, filed on Jun. 1, 2006.

(51) Int. Cl.
*B29D 11/00* (2006.01)

(52) U.S. Cl. ......... 264/1.32; 264/2.6; 264/335; 425/808

(58) Field of Classification Search .................. 264/1.32, 264/2.6, 335; 425/808
See application file for complete search history.

(56) References Cited

U.S. PATENT DOCUMENTS

| | | | |
|---|---|---|---|
| 4,983,332 A | 1/1991 | Hahn et al. | |
| 4,985,186 A | 1/1991 | Nose et al. | |
| 5,264,161 A | 11/1993 | Druskis et al. | |
| 5,316,700 A | 5/1994 | Soye et al. | |
| 5,607,518 A | 3/1997 | Hoffman et al. | |
| 5,639,510 A | 6/1997 | Kindt-Larsen et al. | |
| 5,849,222 A | 12/1998 | Jen et al. | |
| 6,039,899 A | 3/2000 | Martin et al. | |
| 6,071,439 A | 6/2000 | Bawa et al. | |
| 6,502,876 B1 | 1/2003 | Stockhorst et al. | |
| 6,867,245 B2 | 3/2005 | Iwata et al. | |
| 6,869,549 B2 | 3/2005 | Ansell et al. | |
| 6,939,487 B1 | 9/2005 | Ajello et al. | |
| 7,044,429 B1 | 5/2006 | Foreman et al. | |

(Continued)

FOREIGN PATENT DOCUMENTS

EP 0 750 981 A1 1/1997

(Continued)

OTHER PUBLICATIONS

Notice of Allowance mailed Jun. 7, 2010 from related U.S. Appl. No. 11/752,877, filed May 23, 2007.

(Continued)

*Primary Examiner* — Joseph Del Sole
*Assistant Examiner* — James Sanders
(74) *Attorney, Agent, or Firm* — Klein, O'Neill & Singh, LLP (57) ABSTRACT

Contact lens delensing methods are described, and the present delensing methods include using a gas to facilitate separation of a polymerized contact lens product from a contact lens mold member. The contact lens mold member is compressed to deform a portion of the mold member, and gas, such as air, is directed toward the polymerized contact lens product in contact with the portion. The contact lens mold member can be compressed as the mold member and lens product rotate. A vacuum device can be used to separate the polymerized contact lens product from the contact lens mold member after compressing the portion of the mold member and directing the gas towards the mold member. Delensing systems used to practice the present methods are also described.

18 Claims, 7 Drawing Sheets

U.S. PATENT DOCUMENTS

| | | |
|---|---|---|
| 7,135,139 B2 | 11/2006 | Kanematsu et al. |
| 2002/0153623 A1* | 10/2002 | Gobron et al. .................. 264/1.1 |
| 2006/0051454 A1 | 3/2006 | Ansell et al. |
| 2006/0097415 A1 | 5/2006 | Watterson, Jr. et al. |
| 2007/0035049 A1 | 2/2007 | Bruce et al. |
| 2007/0052117 A1* | 3/2007 | Arnet et al. ..................... 264/1.1 |
| 2007/0138670 A1* | 6/2007 | Beebe et al. .................. 264/2.6 |
| 2007/0158865 A1* | 7/2007 | Russell et al. .................. 264/1.1 |
| 2007/0231293 A1 | 10/2007 | Vanderlaan et al. |

FOREIGN PATENT DOCUMENTS

| | | |
|---|---|---|
| EP | 1 078 732 A2 | 2/2001 |
| JP | A-H04-005010 | 1/1992 |
| JP | A-H09-024521 | 1/1997 |
| JP | A-H11-240030 | 9/1999 |
| JP | A-2003-212940 | 7/2003 |
| JP | A-2005-313452 | 11/2005 |
| WO | WO 95/11789 | 5/1995 |

OTHER PUBLICATIONS

Advisory Action mailed Dec. 30, 2009 from related U.S. Appl. No. 11/752,877, filed May 23, 2007.

Final Office Action mailed Oct. 16, 2009 from related U.S. Appl. No. 11/752,877, filed May 23, 2007.

Office Action mailed Apr. 13, 2009 from related U.S. Appl. No. 11/752,877, filed May 23, 2007.

Office Action mailed Feb. 2, 2009 from related U.S. Appl. No. 11/752,877, filed May 23, 2007.

Office Action mailed Mar. 29, 2010 from related Japanese Application No. 2007-171187 (3 pages).

English translation of Office Action mailed Mar. 29, 2010 from related Japanese Application No. 2007-171187 (3 pages).

Office Action mailed Apr. 16, 2010 from related Taiwanese Application No. 096119535 (4 pages).

English translation of Office Action mailed Apr. 16, 2010 from related Taiwanese Application No. 096119535 (4 pages).

PCT International Search Report completed Sep. 14, 2007 and mailed Jan. 23, 2008 from related PCT Application No. PCT/US2007/069679, filed May 24, 2007 (2 pages).

PCT Written Opinion completed Sep. 14, 2007 and mailed Jan. 23, 2008 from related PCT Application No. PCT/US2007/069679, filed May 24, 2007 (6 pages).

International Preliminary Report on Patentability issued Dec. 3, 2008 and mailed Dec. 18, 2008 from related PCT Application No. PCT/US2007/069679, filed May 24, 2007 (6 pages).

* cited by examiner

DELENSING OF OPHTHALMIC LENSES USING GAS

CROSS-REFERENCE TO RELATED APPLICATIONS

This application is a continuation of application Ser. No. 11/752,877, filed May 23, 2007, which claims the benefit of U.S. provisional Application No. 60/803,689, filed Jun. 1, 2006, the entire contents of which are expressly incorporated herein by reference.

FIELD

The present invention relates to manufacturing ophthalmic lenses, such as contact lenses. More particularly, the invention relates to delensing methods and systems that use gas to facilitate separation of a polymerized contact lens product, such as a silicone hydrogel contact lens product, from a contact lens mold member, and contact lenses produced with the methods and systems.

BACKGROUND

Cast molded lenses, such as contact lenses, are produced in cast molding cups. Cast molding cups can be understood to be lens molds formed from two mold members or mold halves. One of the mold members has a concave surface that defines an anterior surface of a lens. The other mold member has a convex surface that defines a posterior surface of the lens. To produce lenses, such as contact lenses, it is necessary to separate the two mold members (e.g., demold the molding cup or lens mold), and to separate the lens product produced in the molding cup (e.g., delens the lens product from one of the mold members).

For relatively rigid pre-hydrated lens products, such as hydroxyethylmethacrylate (HEMA)-based cast molded lens products, the polymerized lens product can be delensed by compressing a mold member with a force sufficient to overcome the attachment force between the lens product and a surface of the mold member. Due to the rigidity of the material, the material tends to favor ifs natural shape. Therefore, the relatively rigid lens product can be easily separated from the mold member using only compression forces. However, such methods are not useful for pre-hydrated lens products that are relatively more flexible or have a lower modulus. For example, such delensing methods do not affectivity separate silicone hydrogel contact lenses or similar lens materials from mold members.

One alternative to delensing relatively flexible lens products is to soak the mold member and the lens product in contact therewith in a volume of liquid. Although lenses can be effectively separated using soaking methods, these methods require additional machinery and time which can negatively impact production of large amounts of contact lenses.

Thus, there remains a need for new delensing methods which permit flexible lens products to be separated from lens molds, and do not require liquid soaks.

SUMMARY

The present methods and systems attempt to address this and other needs. The present methods and systems use a combination of compression and directed gas to separate a lens product from a lens mold member. In addition, the present methods and systems can include steps or components that rotate the mold member while the lens product is being separated from the mold member. The present methods and systems are effective in delensing relatively flexible lens products from lens mold members, and are particularly useful in delensing silicone hydrogel contact lens products from lens mold members.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, and additional disclosure.

DETAILED DESCRIPTION

New methods of manufacturing ophthalmic lenses, such as ocular refractive correction devices, have been invented. More specifically, delensing methods and systems have been invented that effectively separate polymerized ophthalmic lenses, such as contact lenses from a mold member used to produce the lenses. The present methods and systems separate a polymerized lens product from a mold member without the use of liquid, such as water and the like, to soak the lens. Thus, the present methods can be understood to be mechanical delensing methods. Using the present methods and systems, ophthalmic lenses can be produced that have clinically acceptable lens features or properties, as discussed herein.

The following disclosure will be primarily directed to contact lens delensing methods and systems. However, it will be appreciated that embodiments of the present methods and systems can be used in the delensing of other molded lenses from lens molds. For example, the present methods and systems can be used to delens corneal onlay lenses, corneal inlay lenses, intraocular lenses, and other lenses from mold members used to produce the lenses.

In a contact lens cast molding procedure, a polymerizable lens precursor composition, such as a monomer mixture and the like, can be placed in contact with a contact lens mold member. For example, the polymerizable lens precursor composition can be placed on a concave surface of a first mold member. The concave surface of the first mold member defines the anterior surface of a lens obtained therefrom. A second mold member is placed in contact with the first mold member containing the precursor composition to form a lens shaped cavity containing the precursor composition. The second mold member includes a convex surface defining a posterior lens surface of a lens obtained therefrom. The second mold member can be understood to be a male mold member. As used herein, the combination of the first mold member and the second mold member can be understood to be a contact lens mold.

The contact lens mold containing the polymerizable lens precursor composition is exposed to conditions effective in curing or polymerizing the polmerizable lens precursor composition. After the curing or polymerization, a polymerized contact lens product is formed and is located in the contact lens shaped cavity.

The contact lens mold is then demolded to separate the first and second mold members from each other. The polymerized contact lens product remains attached to or in contact with one of the mold members.

After demolding the contact lens mold, the lens is delensed or deblocked from the mold member to which it is attached or with which it contacts. After delensing the polymerized contact lens product, the product undergoes an extraction and hydration process to produce an extracted contact lens and a hydrated contact lens, respectively. The hydrated contact lens can then be inspected, packaged, and sterilized, as understood by persons of ordinary skill in the art.

As understood from the present disclosure, the present methods and systems relate to delensing a polymerized contact lens product from a contact lens mold member. In other words, the present methods and systems relate to separation of a polymerized contact lens product after demolding of a contact lens mold, and before extracting an extractable component from the polymerized contact lens product.

Figure 1:
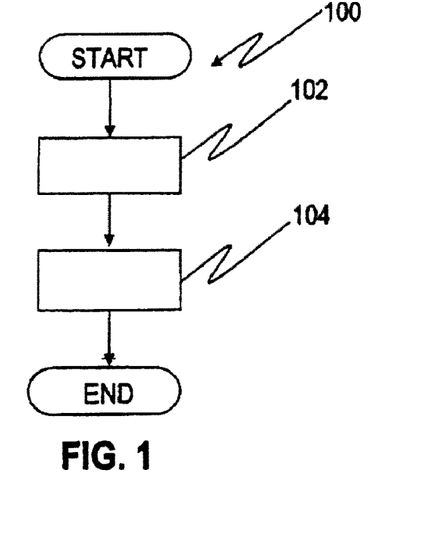
FIG. 1 is a flow chart illustrating a delensing method of an ophthalmic lens.

In one embodiment, and as shown in FIG. 1, a delensing method 100 comprises a step 102 of compressing a portion of a contact lens mold member. The portion of the contact lens mold member has a polymerized contact lens product in contact therewith. The method 100 also comprises a step 104 of directing a gas toward the polymerized contact lens product. The gas is directed towards the polymerized contact lens product to facilitate separation of the polymerized contact lens product from the portion of the contact lens mold member.

In certain embodiments, the compressing step 102 and the directing step 104 occur simultaneously. In other embodiments, the compressing step 102 may begin before the directing step 104. In other embodiments, the directing step 104 may begin before the compressing step. In the illustrated embodiment, the methods comprise compressing a portion of the mold member at the same time that gas is being directed toward the mold member. By performing these two steps, it is possible to lift the edge of the lens product or separate the edge of the lens product from the portion of the mold member, and separate the lens product from the surface of the mold member.

As described in more detail herein, the gas is directed toward the lens product edge. The gas may be directed as a continuous stream of gas or it may be directed in a pulsatile manner or as one or more temporally short pulses of gas. The gas is directed toward the lens product edge and the portion of the mold member so that the force provided by the gas can facilitate lifting or separating at least the lens product edge from the mold member, and preferably the entire lens from the mold member. Thus, the gas may be directed toward the lens product and mold member from a position that is below the edge of the lens product or near the edge of the lens product. As the peripheral portions of the lens product are separated from the mold member, the gas can continue to separate the remaining portions of the lens product until the lens product is completely separated from the mold member. The separation can be achieved by an increase in the gas pressure present between the separated portion of the lens product and the mold member. The illustrated embodiment of the present methods direct pressurized air toward the lens product and mold member. Other embodiments can use other types of gas as desired. The gas can be directed at a pressure that is sufficient to effectively delens the lens product from the mold member. In certain embodiments, including the illustrated embodiments, gas is delivered at a pressure from about 80 psi to about 100 psi. For example, delivering gas at a pressure of about 90 psi can be particularly effective. In additional embodiments, lower pressures of gas can be used. It may be desirable to increase the volume of directed gas for lower gas pressures.

The combined compressing and directing of gas effectively permit the lens product to be separated from the mold member without damaging the lens product. In certain embodiments, including the illustrated embodiment, the portion of the contact lens mold member is a portion having a convex surface forming a posterior lens surface. For example, the mold member may be understood to be a male mold member and the portion refers to a convex dome shaped element which includes a posterior lens defining surface. The portion of the mold member is compressed below the polymerized contact lens product that is contact with the mold member portion. Compressing the portion below the polymerized contact lens product, such as below the edge of the polymerized contact lens product, is effective in providing a void or space near the lens product edge that facilitates the separation effects provided by the directed gas.

The compressing of the mold member can be achieved by directing a compressing assembly toward the center of the mold member at a force and rate effective to deform or compress a portion of the mold member. The gas can be directed toward the lens product and mold member at a force and rate effective to separate the lens product from the mold member. These forces and rates can be empirically determined for different lenses using the methods disclosed herein.

In certain embodiments, including the illustrated embodiment, the compressing step 102 comprises compressing substantially opposing regions of the portion of the contact lens mold member. For example, as described in detail herein, when the portion of the mold member has a circular cross-section, the compressing can occur at two regions of the mold member that are located about 180 degrees apart from each other. In other embodiments, the compressing can occur at three regions of the mold member that are located about 120 degrees apart from each other. Still other embodiments can compress the mold member at more than three regions if desired. In certain embodiments, the compression of the mold member occurs substantially or entirely in a single plane, such as a single horizontal plane.

In certain embodiments, including the illustrated embodiment, the directing step 104 comprises directing the gas toward substantially opposing regions of the portion of the contact lens mold member. For example, as described in detail herein, when the portion of the mold member has a circular cross-section, the gas or gas stream can be directed towards two regions of the mold member that are located about 180 degrees apart from each other. In other embodiments, the gas can be directed at three regions of the mold member that are located about 120 degrees apart from each other. Still other embodiments can direct the gas toward the mold member at more than three regions if desired.

In further embodiments, including the illustrated embodiment, the gas is directed to substantially the same region of the contact lens mold member being compressed.

The present methods can also include additional steps. For example, embodiments of the present methods can comprise placing the contact lens mold member on a mold member holding device or a chuck; separating the polymerized contact lens product from the portion of the contact lens mold member using a vacuum device; placing the separated polymerized contact lens product on a lens carrier; rotating the contact lens mold member prior to the compressing step 102 or prior to the directing step 104, and separating the polymerized contact lens product from the portion of the contact lens mold member using a rotating vacuum device; and combinations thereof.

Figure 2:
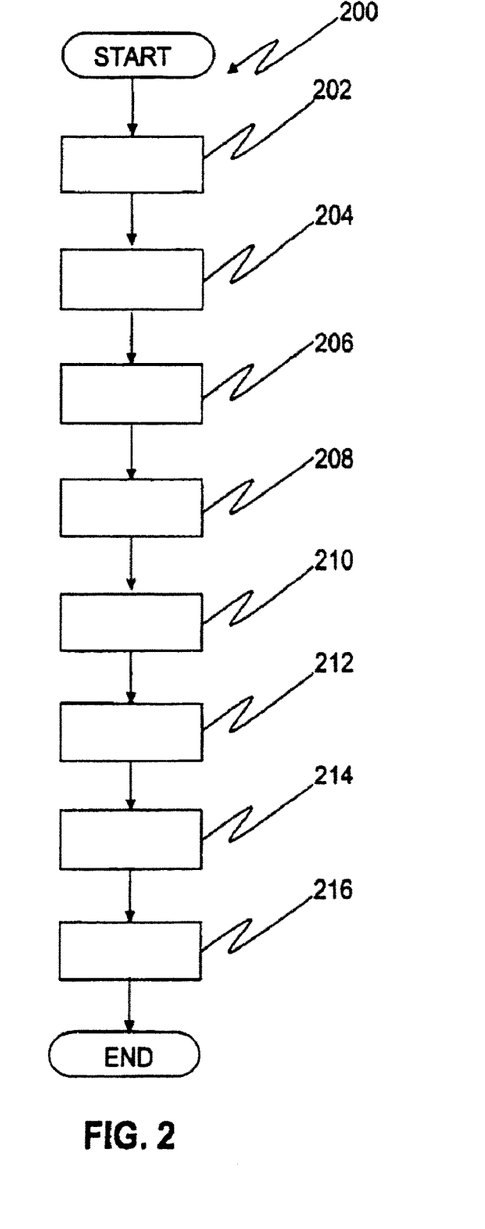
FIG. 2 is a flow chart illustrating another delensing method for a silicone hydrogel contact lens.

For example, one embodiment of the present methods is illustrated by the flow chart of FIG. 2. As shown in FIG. 2, a delensing method 200 comprises a step 202 of placing a demolded male mold member on a mold member holding device or chuck. A holding device is rotated at step 204 with the mold member coupled to the holding device. The method also includes a step 206 of rotating a vacuum device at the same rate and direction as the rotating holding device. In other words, a delensing method may be understood to comprise a step of rotating a chuck containing a male mold member and rotating a vacuum device at the same rate and direction as the chuck. The method 200 comprises a step 208 of compressing the portion of the mold member, as described herein, and a step 210 of directing a gas toward the portion of the mold member, as described herein. The compressing step 208 and the directing step 210 occur when the rotating vacuum device is in contact with the polymerized contact lens product. The method 200 also comprises a step 212 of separating the polymerized contact lens product from the portion of the contact lens mold member using the vacuum device. After separating the polymerized contact lens product from the mold member, the method 200 comprises a step 214 of placing the separated polymerized contact lens product on a lens carrier. The method also comprises a step 216 of removing the contact lens mold member from the holding device. The method can then be repeated for another mold member having a polymerized contact lens product in contact therewith.

Thus, an embodiment of the present methods comprises placing a contact lens mold member on a rotatable chuck or holding device prior to compressing the portion of the contact lens mold member or directing gas toward the polymerized contact lens product located on or in the mold member. The contact lens mold member is securely coupled or attached to the rotatable chuck. For example, the contact lens mold member is attached to the chuck so that a polymerized contact lens product can be removed from the mold member without removing the mold member from the chuck. In at least one embodiment, the mold member is placed on the rotatable chuck and is attached thereto with an interference fit. Other forms of coupling or attachment can also be used. For example, in certain embodiments, the chuck may include a sidewall region with one or more movable projections that can be moved in contact with a portion of the contact lens mold member to retain the mold member during the delensing method and subsequently retracted to permit the mold member to be released from the chuck. As another example, the chuck could include one or more clamping devices to releasably retain the mold member on the chuck during the delensing procedure.

Delensing methods that include a step of separating the polymerized contact lens product from the contact lens mold member using a vacuum device include contacting the polymerized contact lens product with a portion of the vacuum device. The vacuum device should not damage or negatively affect the surface of the lens product that it contacts. In certain embodiments, the vacuum device includes a contacting end that includes a flexible lens product contacting component. For example, the contact end can include an elastomeric or resilient rubber tip. More specifically, the contact end can include a silicone rubber tip. The contact end includes a vacuum port or a bore so that negative pressure can be delivered through the device and the contact end to releasably hold a polymerized contact lens product during a delensing process.

In at least one embodiment, a delensing method comprises rotating the contact lens mold member prior to compressing the portion of the mold member or prior to directing gas toward the polymerized contact lens product that is in contact with the portion of the mold member, and separating the polymerized contact lens product from the portion of the mold member using a rotating vacuum device which rotates at the same rate or substantially the same rate and direction as the rotating contact lens mold member.

In embodiments of the present methods, the delensing method is effective in separating the polymerized lens product from the mold member without adversely affecting the optical properties of a hydrated contact lens obtained from the polymerized contact lens product.

Methods may comprise placing the separated polymerized contact lens product on a lens carrier. After placement on a lens carrier, the lens product can be directed to one or more manufacturing or processing stations. For example, the delensed polymerized contact lens product can be directed to an extraction station, a hydration station, or a combined extraction/hydration station of a contact lens manufacturing system. In certain embodiments, the delensed polymerized contact lens product is placed on a conveyor device. In addition embodiments, the delensed polymerized contact lens product is placed in a tray or a well suitable for use in an extraction procedure. In still additional embodiments, the delensed contact lens product is placed on a conveyor and then placed in a tray or well.

Methods may also comprise removing the mold member without the contact lens product from the chuck.

Figure 3:
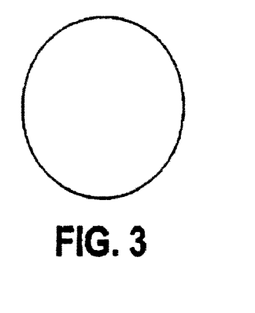
FIG. 3 is an illustration of a contact lens produced using the present methods and systems.

Embodiments of the present invention also relate to contact lenses produced by the delensing methods disclosed herein. For example, FIG. 3 is an illustration of a contact lens produced by the present methods. In certain embodiments, including the illustrated embodiments, the contact lens is a silicone hydrogel contact lens. Thus, embodiments of the present invention can be understood to include a polymerized contact lens product that comprises a silicone-containing component. However, in other embodiments, the contact lens is a non-silicon containing contact lens.

The present methods and systems provide effective separation of a polymerized contact lens product that is more flexible than polyHEMA-based polymerized contact lens products. For example, the present pre-extracted polymerized contact lens products may have a flexural modulus that is less than the flexural modulus of a pre-extracted polyHEMA-based polymerized contact lens product. In certain embodiments, the hydrated contact lenses produced by the present methods have a flexural modulus less than about 1.4 MPa. For example, embodiments of hydrated contact lenses can have a flexural modulus of about 1 MPa, about 0.8 MPa, about 0.6 MPa, about 0.4 MPa, about 0.3 MPa, or any value between 0.2 MPa and 1.4 MPa. Thus, in certain embodiments of the present methods, the polymerized contact lens product has a modulus no greater than a modulus of a pre-extracted silicone hydrogel contact lens product. The modulus of the lens product and hydrated contact lenses can be determined using conventional methods known to persons of ordinary skill in the art.

The present methods and systems are also useful with contact lens molds that are somewhat flexible or resilient. For example, the present methods and systems are useful with contact lens molds that comprise mold members that interferingly engage to form a contact lens mold. In certain embodiments, including the illustrated embodiments, the contact lens mold member that is placed on the chuck comprises a hydrophobic resin material. For example, the contact lens mold member may comprise a polyolefin resin material. Examples of polyolefin resins useful in the present molds include polypropylene, polyethylene, and polystyrene.

Another aspect of the present invention relates to delensing systems, such as contact lens delensing systems. Again, although the present description is provided in reference to contact lenses, the description, including the systems and system components, can be used in delensing systems for other types of molded lenses, including corneal onlay lenses, corneal inlay lenses, intraocular lenses, and the like.

Figure 4:
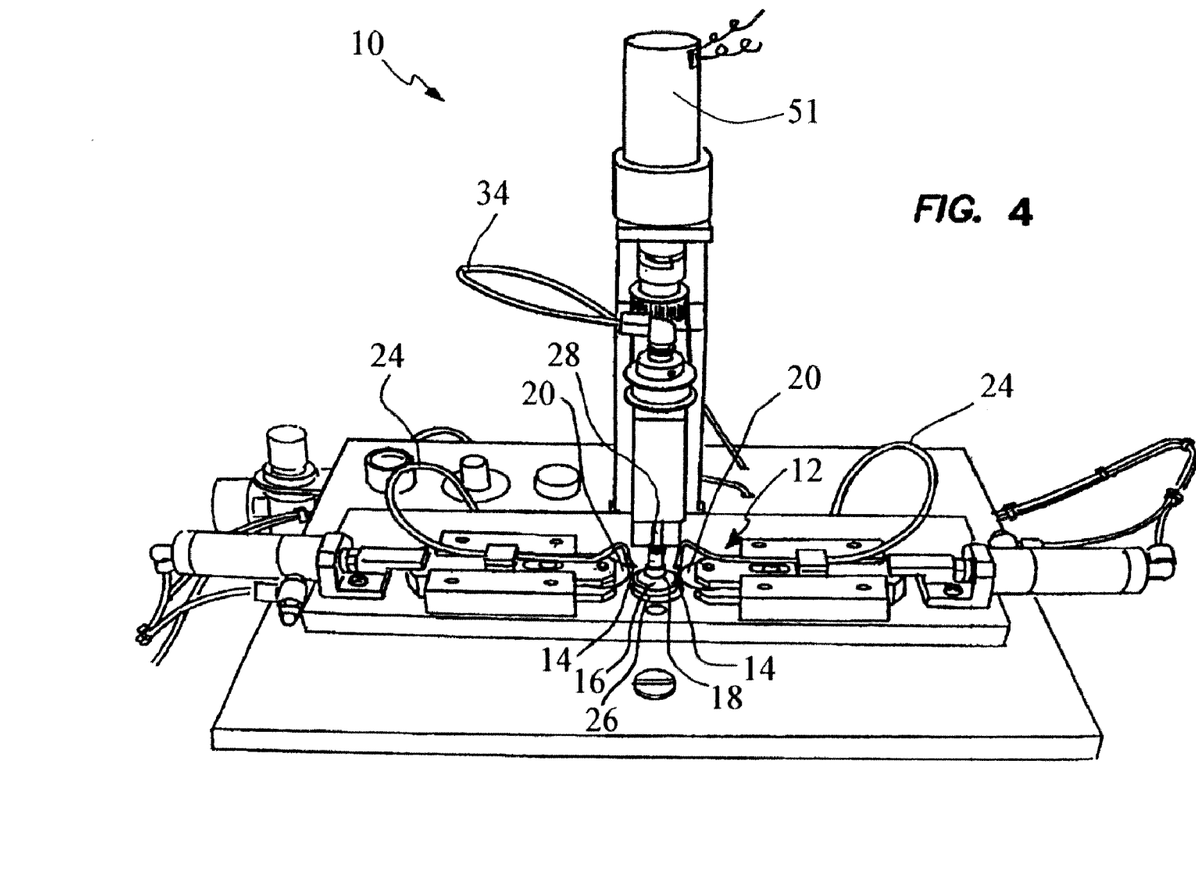
FIG. 4 is a perspective view an illustration of a ophthalmic lens delensing system.

An example of one delensing system 10 is illustrated in FIG. 4. The delensing system 10 comprises a contact lens mold member compression assembly 12 and one or more gas ports 14. The compression assembly 12 is structured, such as sized and/or shaped, to compress a portion of a contact lens mold member (as shown at 16 in FIG. 4) having a polymerized contact lens product (18 in FIG. 4) in contact with the mold member. In the illustrated embodiment of the delensing system 10, two gas ports 14 are provided. The gas port or gas ports 14 are positioned to direct gas toward the polymerized contact lens product 18. The gas interacting with the lens product 18 facilitates separation of the lens product 18 from the portion of the contact lens mold member 16.

As used herein, the portion of the contact lens mold member 16 refers to the domed region of the mold member 16 that includes the convex lens defining surface that defines a posterior surface of the contact lens product 18. Thus, as shown in more detail in FIGS. 8 and 9, the contact lens mold member 16 includes a base that is structured to be placed in contact with a chuck, and a lens contacting portion spaced apart from the base. Additional details will be discussed herein.

Figure 5:
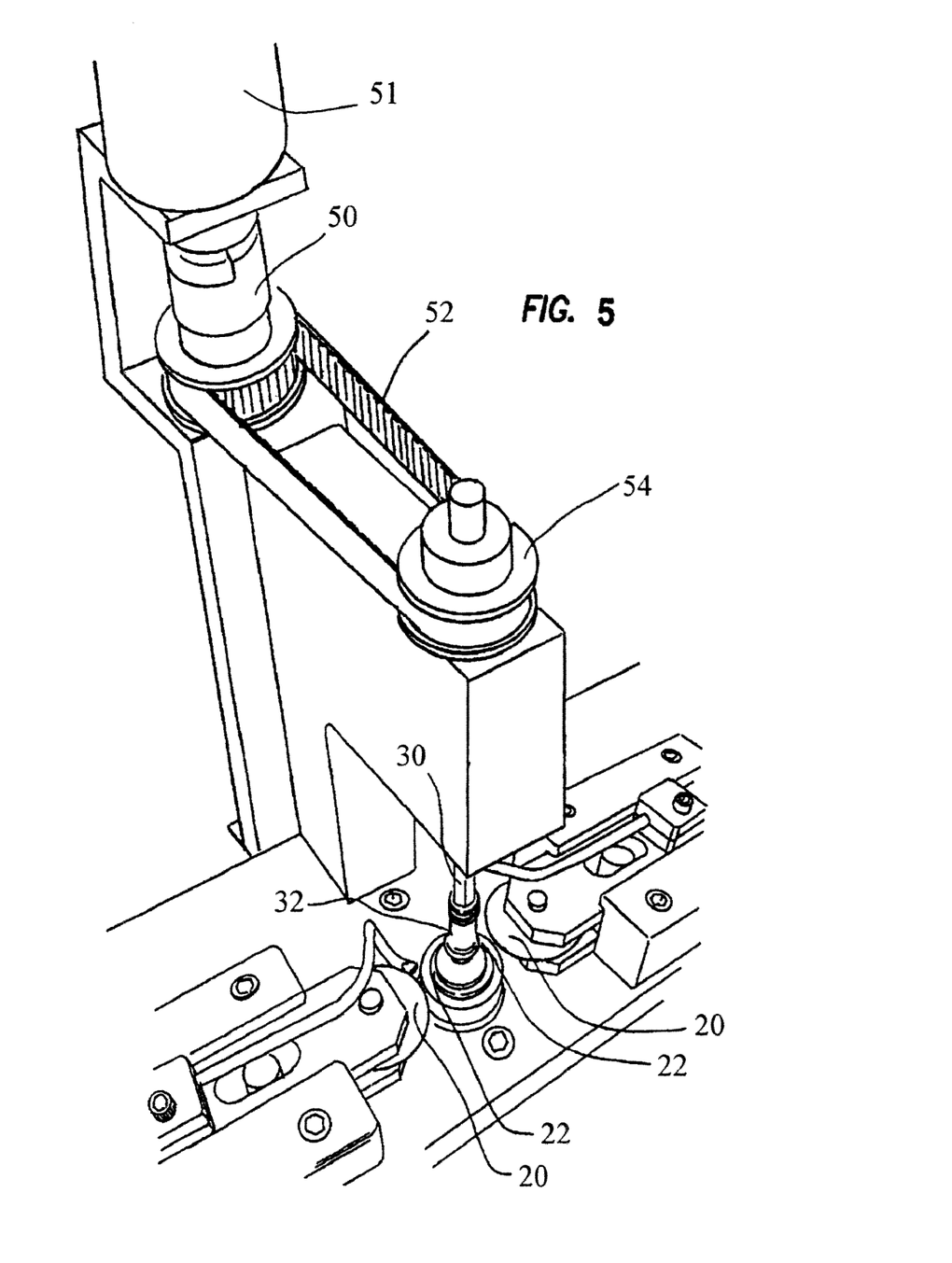
FIG. 5 is a magnified perspective view of the delensing system of FIG. 4.

In the illustrated embodiment of the delensing system 10, the contact lens mold member compression assembly 12 comprises a plurality of compression members 20 positioned to compress substantially opposing regions 22 of the contact lens mold member 16 (see FIGS. 4 and 5). For example, the compression members 20 contact the contact lens mold member 16 at two regions 22 of the portion of the mold member that are about 180 degrees apart from each other. In other embodiments, more than two compression members can be included, and such members can contact the mold member 22 at substantially opposing regions. For example, three compression members can contact the mold member 22 at regions that are approximately 120 degrees apart from each other. Similarly, four compression members can contact the mold member 22 at regions that are about 90 degrees apart from each other.

In the illustrated embodiment, the compression members 20 are illustrated as rotatable discs. More specifically, the compression members 20 can be understood to be circular discs having a top surface, an opposing bottom surface, and a peripheral edge region extending from the top surface to the bottom surface. In other systems, the discs can have different shapes. In addition, the peripheral edge region can have a variety of cross-sectional configurations. For example, in one embodiment, the peripheral edge region is rounded so that the edge of the compression member does not cut or penetrate the portion of the contact lens mold member 16. In other embodiments, the peripheral edge region can include a beveled top edge surface, a beveled bottom edge surface, or both.

In the delensing system 10 illustrated in FIG. 4, the system comprises a plurality of gas ports 14. For example, the system is illustrated with two gas ports 14. The gas ports 14 are positioned to direct gas, such as a continuous or pulsatile gas stream, towards substantially opposing regions 22 of the contact lens mold member 16. In the illustrated embodiment, the gas ports 14 direct gas to substantially the same regions contacted by the compression members 20. The gas ports 14 receive gas from gas lines 24, which are directly or indirectly coupled to a pressurized gas source.

The delensing system 10 is illustrated as also comprising a chuck 26. The chuck 26 can be understood to be any contact lens mold member holding device. In the illustrated embodiment, the chuck has an outer dimension or shape that is inserted into the base of the contact lens mold member and coupled thereto via an interference fit. Other chucks can include one or more retractable elements, such as pins and the like, that can extend from an exterior surface of the chuck and retain the mold member thereto. Or, other chucks can include one or more additional clamping devices to hold the mold member on the chuck. The chuck 26 of the illustrated delensing system 10 is a rotatable chuck. In other words, the chuck 26 can rotate during delensing of the polymerized contact lens product 18. Rotating the chuck 26 can facilitate providing a substantially even compression of the portion of the mold member 16 by the compression members 20. For example, the portion of the mold member 16 can be compressed around the entire perimeter of the portion and provide substantially even separation of the lens product from the mold member. In addition, in the illustrated delensing system 10, the compression members 20 are also rotatable such that they can rotate as they contact the rotating mold member 16 located on the rotating chuck.

The illustrated delensing system 10 also comprises a vacuum device 28. The vacuum device 28 separates the polymerized contact lens product 18 from the contact lens mold member 16 after the mold member 16 has been compressed by the compression members 20 or after gas has contacted the polymerized contact lens product, or after both. The illustrated vacuum device 28 is rotatable. Thus, an embodiment of the present delensing systems 10 can be understood to comprise a rotatable chuck 26 structured to retain the contact lens mold member 16, and a rotatable vacuum device 28 structured to remove the contact lens product 18 from the contact lens mold member 16.

As shown in the figures, the vacuum device 28 includes an elongated body member 30 that has a lens contacting end 32. The end 32 is structured to contact the polymerized contact lens product 18 without damaging the product. In the illustrated embodiment, the end 32 comprises a flexible material, such as a rubber material. For example, the end 32 of the vacuum device 28 comprises a silicone rubber tip. A bore is present in the vacuum device and the bore provides a passageway for a vacuum to be applied to the polymerized lens product 18. For example, the vacuum device may be coupled to a vacuum line 34 which reduces the pressure in the vacuum device and at the end 32 to hold the polymerized lens product 18. In an alternative embodiment, a pickup disc (not shown) having a complimentary convex surface as the anterior surface of the polymerized lens product may be attached to the end 32 of the vacuum device for grabbing the device, using any known prior art attachment method. The pickup disc may be made from a rigid to semi-rigid material, such as polycarbonate, and incorporates a plurality of tiny bores or holes. When the pickup disc is in contact with the polymerized lens product 18 and vacuum is applied, suction is generated on the lens product through the plurality of tiny holes to pickup the lens product. Holes in the order of about 2 mils to about 0.15 inch, either in a uniform diameter array or random diameter array, may be incorporated.

Figure 6:
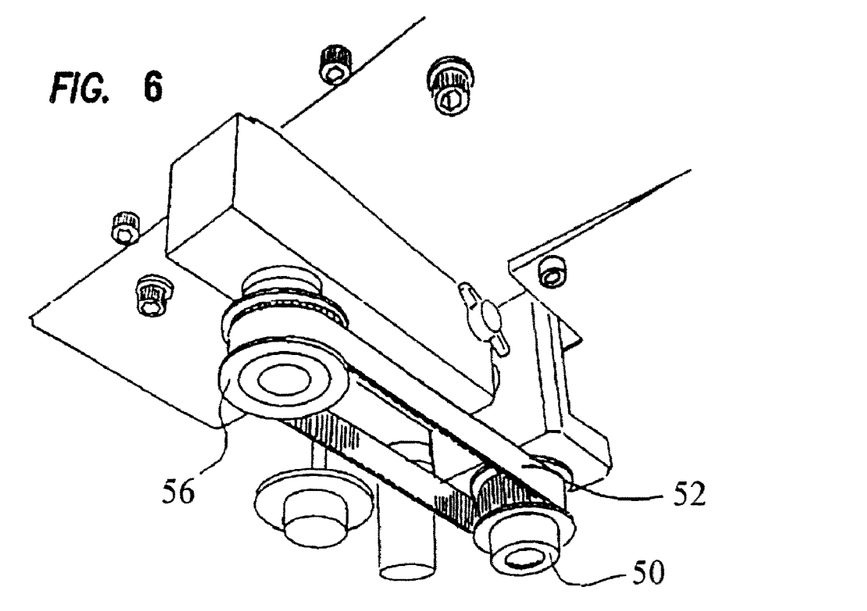
FIG. 6 is a perspective view of a rotational component for rotating a chuck of the delensing system of FIG. 4.

During the illustrated delensing process, the vacuum device 28 and the chuck 26 rotate at the same speed and in the same direction. The similar rotation of the two components permit the polymerized lens product to be manipulated without scratching, scoring, or otherwise damaging the lens product. In the illustrated delensing system 10, the vacuum device 28 and the chuck 26 are coupled to a single motor 51. The motor includes a rotating rod 50 (see FIGS. 5 and 6). A translating mechanism 52, such as a belt, band, or other similar device, couples the rotating rod 50 to a vacuum device rotating element 54 and to a chuck rotating element 56. The rotation of the rotating rod 50 can thereby cause identical rotation of the vacuum device 28 and the chuck 26.

Figure 7:
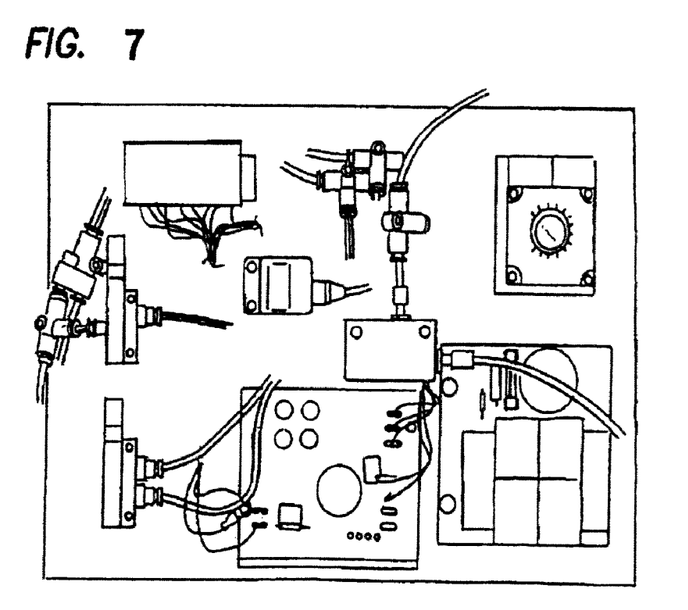
FIG. 7 is a plan view of an illustration of mechanical and electrical components of the delensing system of FIG. 4.

FIG. 7 is an illustration of various conventional electrical and mechanical components to control the operation of the present delensing systems.

The present systems and components thereof can be made using conventional machined equipment as understood by persons of ordinary skill in the art. For example, the machinery such as the compression members, the chuck, and the vacuum device can be machined from light weight, durable metal materials. The end of the vacuum device can be made from silicone rubber. The gas lines can be made from plastic materials.

Figure 8:
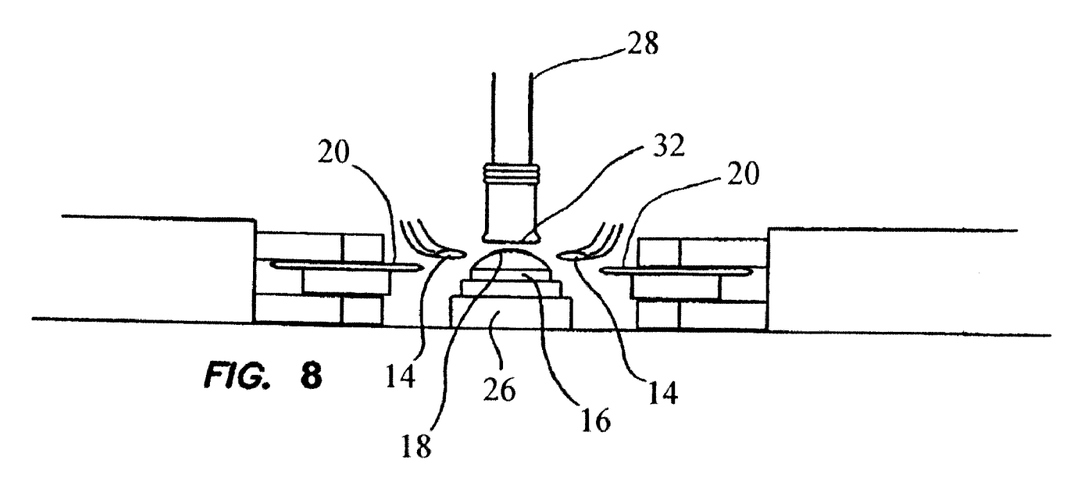
FIG. 8 is a side plan view of contact lens on a male contact lens mold member on a chuck of the delensing system of FIG. 4 prior to delensing.
Figure 9:
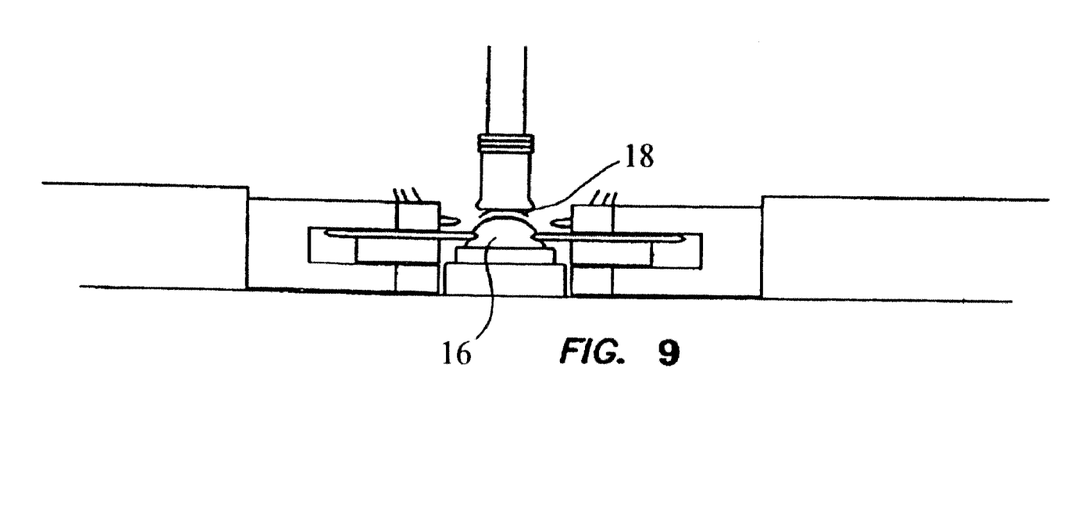
FIG. 9 is a side plan view similar to FIG. 8 after a delensing process.

As described above, the present delensing systems 10 effectively delens soft lens products from lens molds. For example, as shown in FIG. 8, a male mold member 16 is located on a rotatable chuck 26. A vacuum device 28 comprising a silicone rubber distal end 32 is located above the polymerized contact lens product 18 located on a portion of the male mold member 16. The chuck 26 and vacuum device 28 can rotate and cause the polymerized contact lens product 18 to rotate due to its attachment to the chuck 26 via the male mold member 16. Air is directed out of gas ports 14 toward the polymerized contact lens product 18 and the compression members are moved towards the center of the contact lens product 18, as shown in FIG. 9. The compression members 20 contact the portion of the male mold member 16 and compress the portion of the male mold member to form a depression in the portion. Strain gauge, proximity switch, load sensors, or other known prior art devices and methods may be incorporated to ensure adequate and sufficient compression on the male mold member 16 by the compression members 20. At the same time, the air directed from the gas ports 14 facilitates lifting or separating the edge of the polymerized lens product 18, and the entire lens product, from the surface of the male mold member 16. The vacuum device 28 then removes the polymerized lens product 18 from the surface of the male mold member 16 for further processing.

Figure 10:
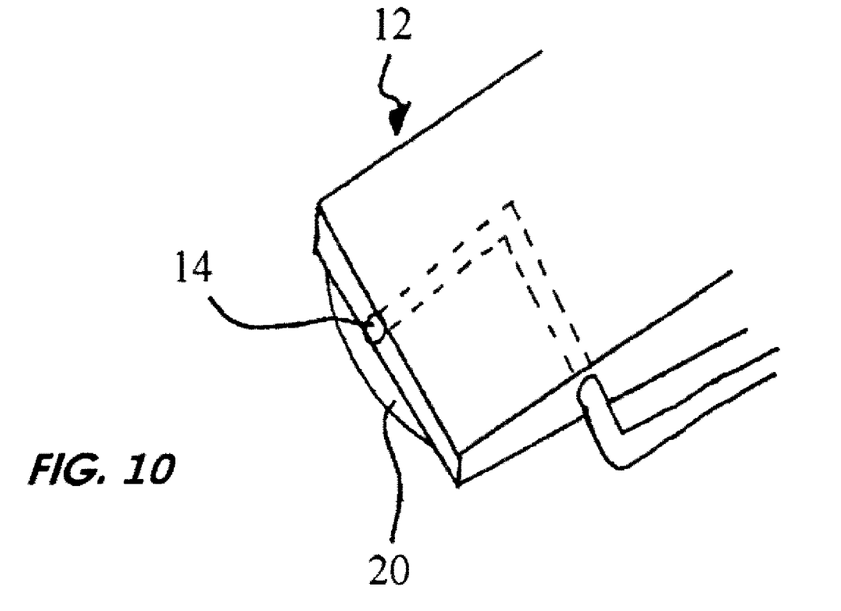
FIG. 10 is a perspective view of an additional compression assembly useful in the present delensing systems and methods.

FIG. 10 illustrates another embodiment of the present compression members and gas ports. In this embodiment, the gas port 14 is provided as an integral component of the compression assembly 12. Thus, with such compression assemblies, a reduction in required space for the delensing systems can be obtained. Two such compression assemblies can be provided in the present delensing system. Air or other gas can be directed out of the gas port at the same location the compression member 20 contacts the contact lens mold member.

It can be understood from the present disclosure, that the gas pressure can increase between the separated portion of the lens product edge and the mold member. The increased gas pressure can effectively separate the remaining portion of the lens product from the mold member. In other words, embodiments of the methods include separating the lens edge from the mold member by compressing or deforming the mold member and delensing the lens product from the mold member by increasing the gas pressure between the lens product and the mold member. For example, when gas is delivered at a pressure of about 90 psi, the gas pressure that causes delensing of the entire lens product can be greater than the delivered gas pressure.

The present methods and systems can be, and preferably are, automated. Thus, one or more robots or robotic components can be used to practice the present methods and use the systems. The methods and systems can be provided as components in a lens manufacturing line. For example, a manufacturing line may include a delensing station that includes one or more of the present delensing systems, or a delensing station that performs the present delensing methods. In addition, multiple delensing systems can be provided to facilitate the production of large quantities of lenses.

Figure 11:
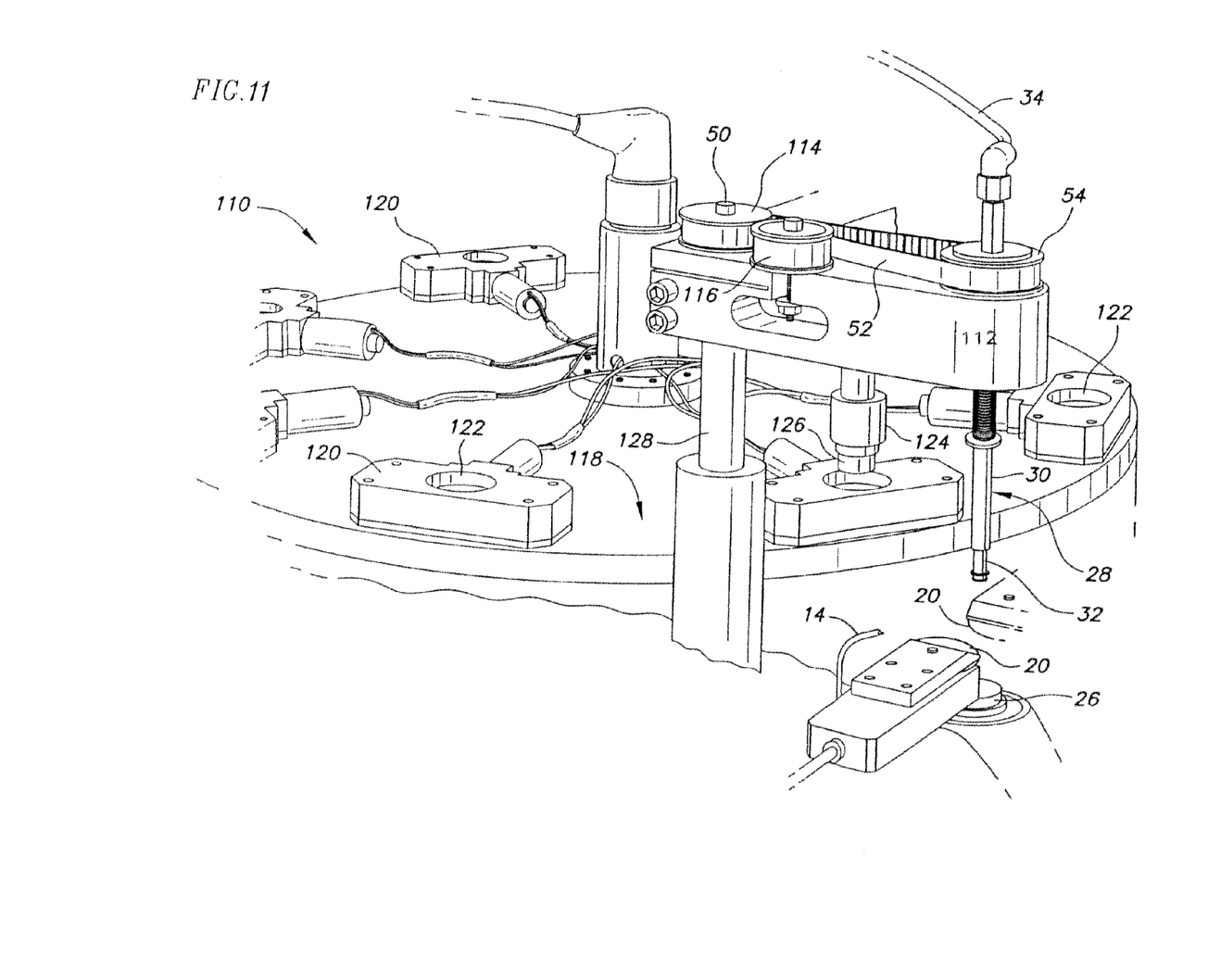
FIG. 11 is a perspective view of an exemplary automated delensing system provided in accordance with aspects of the present invention.

With reference to FIG. 11, an automated delensing system provided in accordance with aspects of the present invention is shown, which is generally designated 110. The system 110 comprises a chuck 26 and a vacuum device 28 mounted to a vacuum arm assembly 112 for holding a contact lens mold member (not shown). A vacuum device rotating element 54 is mounted above the vacuum arm assembly and is rotatable by a drive element 114, which is connected to a rotating rod 50. The drive element 114 rotates the vacuum device rotating element 54 by a translating mechanism 52, which may be a belt or a chain as previously discussed. Optionally, an adjustable belt tensionser 116 may be incorporated for adjusting the tension on the translating mechanism.

A motor (not shown) is mounted below the vacuum arm assembly 112 for rotating the rotating rod 50, which then rotates the drive element 114 to drive the translating mechanism 52 and which then rotates the vacuum device rotating element 54. As previously discussed with reference to FIG. 6, a second set of drive element 114 and translating mechanism 52 is incorporated below the chuck 26 for rotating a chuck rotating element (not shown) to then rotate the chuck 26 at the same rotational speed as the vacuum device 28. The lower rotating assembly may also optionally include a belt tensioner. Other features incorporated in the present automated delensing system 110 include a plurality of gas ports 14 (only one shown), a plurality of compression members 20, and a lens contacting end 32 mounted on the end of the elongated body member 30 of the vacuum device 28.

To provide a steady supply of contact lens mold members for placing onto the chuck 26 for delensing, a rotating table 118 comprising a plurality of lens mold carriers 120 is incorporated. The carriers 120 each has a well or cavity 122 for receiving a contact lens mold member 16 (not shown), which is placed therein by a conveyor system or a pick and drop arm assembly (not shown). In one exemplary embodiment, eight equally spaced apart lens mold carriers 120 are mounted on the rotating table 118. The rotating table 118 is configured to successively rotate the carriers 120 to a loading assembly 124 comprising a loading arm 126, which then grabs the lens mold member 16 and places it onto the chuck 26. To provide clearance for the loading assembly 124, the vacuum arm 112 is rotatable away from a position above the chuck 26. The loading assembly 124 then rotates to a position over the chuck 26 and then lowers the loading arm 126 to place the lens mold member 16 onto the receiving chuck. In one exemplary embodiment, both the loading assembly 124 and the vacuum arm 112 are mounted to a same rotating shaft 128 to then move or rotate in unison. The loading arm 126 may incorporate a vacuum device for picking up the lens mold members. Alternatively, articulating fingers or other mechanical devices may be used.

The vacuum arm 112 is sequenced to rotate back over the chuck to engage the lens contacting end 32 with the lens product, either before or after the gas ports 14 and the compression members 20 are activated to compress the lens mold member 16 and to lift the lens product from the lens mold member. The vacuum arm 112 then raises the elongated body member 30 and rotates to move over to a lens carrier (not shown) to deposit the removed lens product. The delensing process then repeats by turning the rotating table 118 to move, such as incrementally move, the next lens mold carrier 120 under the loading assembly 124 to then load the lens mold member 16 into the waiting chuck 26.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure. For example, in certain embodiments, the present methods and systems may be used to separate a lens from a female mold member. For example, a gas, such as air, could be directed into a concave surface of the female mold member where the polymerized lens product is located. The female mold member can be compressed to overcome the physical interaction between the lens and the concave surface of the mold member.

In addition, embodiments of the present methods and systems can comprise directing a ring of gas around the mold member and/or the lens product edge. For example, an annular stream of gas can be directed toward the lens product edge. The gas pressure can increase substantially equally around the perimeter of the separated portion of the lens product to effectively delens the lens product. Such embodiments may not require the lens mold to be rotated during the delensing procedure. Additional embodiments are also within the scope of the present invention.

What is claimed is:

1. A method of manufacturing a polymerized silicone hydrogel contact lens from a contact lens mold member, comprising:
    demolding a contact lens mold to separate a first contact lens mold member and a second contact lens mold member from each other, such that a polymerized silicone hydrogel contact lens product remains attached to or in contact with a convex surface of the second contact lens mold member, the convex surface of the second mold member defining a posterior lens surface;
    delensing the polymerized silicone hydrogel contact lens product by (a) compressing a portion of the second contact lens mold member having the polymerized silicone hydrogel contact lens product attached to or in contact therewith, and (b) directing a gas toward the polymerized silicone hydrogel contact lens product to facilitate separation of the polymerized silicone hydrogel contact lens product from the portion of the second contact lens mold member; and
    after the demolding and delensing, extracting an extractable component from the polymerized silicone hydrogel contact lens product;
    wherein the directing step begins before the compressing step.

2. The method of claim 1, wherein the second contact lens mold member comprises a polyolefin resin material.

3. The method of claim 1, wherein the portion of the second contact lens mold member is compressed below the polymerized silicone hydrogel contact lens product.

4. The method of claim 1, wherein the gas is air.

5. The method of claim 1, wherein the gas is delivered as a continuous gas stream or as a pulsatile gas stream.

6. The method of claim 1, wherein the gas is delivered at a pressure from about 80 psi to about 100 psi.

7. The method of claim 1, wherein the compressing comprises compressing substantially opposing regions of the portion of the second contact lens mold member.

8. The method of claim 1, wherein the compressing occurs at three regions of the second mold member, or at more than three regions of the second mold member.

9. The method of claim 1, wherein the directing comprises directing the gas toward substantially opposing regions of the portion of the second contact lens mold member.

10. The method of claim 1, wherein the directing comprises directing the gas toward the edge of the silicone hydrogel contact lens product.

11. The method of claim 1, further comprising placing the second contact lens mold member on a rotatable chuck prior to compressing the portion of the second contact lens mold member or directing gas toward the polymerized silicone hydrogel contact lens product.

12. The method of claim 1, wherein the delensing step further comprises separating the polymerized silicone hydrogel contact lens product from the portion of the second contact lens mold member using a vacuum device.

13. The method of claim 8, wherein the delensing step further comprises placing the separated polymerized silicone hydrogel contact lens product on a lens carrier.

14. The method of claim 12, wherein the delensing step further comprises rotating the second contact lens mold member prior to compressing the portion thereof or directing gas toward the polymerized silicone hydrogel contact lens product, and separating the polymerized silicone hydrogel contact lens product from the portion of the second contact lens mold member using a vacuum device comprises separating the polymerized silicone hydrogel contact lens product using a rotating vacuum device which rotates at the same rate and direction as the rotating second contact lens mold member.

15. The method of claim 1 which is effective in separating the polymerized silicone hydrogel contact lens product from the second mold member without adversely affecting the optical properties of a hydrated silicone hydrogel contact lens obtained from the polymerized silicone hydrogel contact lens product.

16. The method of claim 1, further comprising the steps of placing a polymerizable lens precursor composition in contact with the first mold member and the second mold member, and exposing the polymerizable lens precursor composition to conditions effective in curing or polymerizing the polymerizable lens precursor composition, prior to the demolding step.

17. The method of claim 1, after the extracting step, further comprising the steps of hydrating, inspecting, packaging and sterilizing the extracted silicone hydrogel contact lens, to produce a packaged silicone hydrogel contact lens.

18. The method of claim 1, wherein the polymerized silicone hydrogel contact lens product has a flexural modulus of less than 1.4 MPa.

* * * * *

UNITED STATES PATENT AND TRADEMARK OFFICE
CERTIFICATE OF CORRECTION

PATENT NO. : 8,197,724 B2  
APPLICATION NO. : 12/829110  
DATED : June 12, 2012  
INVENTOR(S) : Zbigniew Witko Page 1 of 1

It is certified that error appears in the above-identified patent and that said Letters Patent is hereby corrected as shown below:

Title page, Item (73), under "Assignee", in column 1, line 1, delete "Coopervision" and insert -- CooperVision --, therefor.

In column 1, line 42, delete "ifs" and insert -- it's --, therefor.

In column 1, line 47, delete "affectivity" and insert -- affectively --, therefor.

In column 2, line 54, delete "lenses" and insert -- lenses, --, therefor.

In column 3, line 21, delete "polmerizable" and insert -- polymerizable --, therefor.

In column 4, line 38, after "is" insert -- in --.

In column 10, line 19, delete "member" and insert -- member, --, therefor.

In column 10, line 46, delete "tensionser" and insert -- tensioner --, therefor.

Signed and Sealed this  
Fourth Day of December, 2012

David J. Kappos  
*Director of the United States Patent and Trademark Office*